(12) United States Patent
McDonald

(10) Patent No.: US 9,370,044 B2
(45) Date of Patent: Jun. 14, 2016

(54) THERMAL STORAGE DEVICE CONTROLLER

(75) Inventor: Alan McDonald, Antrim (GB)

(73) Assignee: Basic Holdings, Cloghran, Co. Dublin (IE)

( * ) Notice: Subject to any disclaimer, the term of this patent is extended or adjusted under 35 U.S.C. 154(b) by 721 days.

(21) Appl. No.: 13/703,068

(22) PCT Filed: Jun. 10, 2011

(86) PCT No.: PCT/EP2011/059679
§ 371 (c)(1),
(2), (4) Date: Jan. 30, 2013

(87) PCT Pub. No.: WO2011/154521
PCT Pub. Date: Dec. 15, 2011

(65) Prior Publication Data
US 2013/0146587 A1    Jun. 13, 2013

(30) Foreign Application Priority Data

Jun. 10, 2010  (GB) .................................. 1009698.0
Feb. 4, 2011  (GB) .................................. 1101971.8

(51) Int. Cl.
H05B 1/02 (2006.01)
G05D 23/19 (2006.01)
H02J 3/14 (2006.01)

(52) U.S. Cl.
CPC .............. H05B 1/02 (2013.01); G05D 23/1923 (2013.01); H02J 3/14 (2013.01); Y02B 70/3275 (2013.01); Y04S 20/244 (2013.01)

(58) Field of Classification Search
CPC ........ H05B 1/02; H05B 1/023; H05B 1/0288; H05B 2203/021; G05D 23/1923; H02J 3/14; Y02B 70/3275; Y04S 20/244

USPC .......... 219/494, 483–486, 497, 506; 392/449, 392/454, 498
See application file for complete search history.

(56) References Cited

U.S. PATENT DOCUMENTS

| 4,023,043 A | 5/1977 | Stevenson ........................ 307/38 |
| 5,462,225 A | 10/1995 | Massara et al. .................. 236/47 |
| 5,956,462 A | 9/1999 | Langford ...................... 392/449 |
| 2007/0198133 A1* | 8/2007 | Hirst ......................... H02J 3/14 700/295 |
| 2010/0245103 A1* | 9/2010 | Plaisted ................ F24D 11/003 340/657 |
| 2011/0030753 A1* | 2/2011 | Weaver ..................... F01K 3/16 136/201 |

FOREIGN PATENT DOCUMENTS

| GB | 1351009 | 4/1974 | ............. G05D 23/19 |
| GB | 1 519 174 | 7/1978 | ............. H02J 13/00 |
| GB | 2460548 | 12/2009 | ............. F24D 15/02 |
| WO | WO 2009/067208 A1 | 5/2009 | ............... H02J 3/14 |

OTHER PUBLICATIONS

International Search Report and Written Opinion for International Application No. PCT/EP2011/059679, Mar. 26, 2012.
Combined Search and Examination Report for corresponding GB1009698.0, Nov. 12, 2010.

* cited by examiner

*Primary Examiner* — Mark Paschall
(74) *Attorney, Agent, or Firm* — Kusner & Jaffe

(57) ABSTRACT

A controller providing selective activation of thermal storage devices within a network to balance requirements of a user to manage their heating and the network operator to balance the load available with the load on the network.

64 Claims, 5 Drawing Sheets

THERMAL STORAGE DEVICE CONTROLLER

FIELD OF THE INVENTION

The present invention relates to electrical grids and load management within same. The invention more particularly relates to thermal storage devices provided within an electrical network and in particular to controllers for same. Within the context of the present teaching the term thermal storage device includes electrical storage heaters which provide space heating and water cylinders which are heated using an electrical element. The invention also relates to the control of the operation of such thermal storage devices in response to variances in expected load within an electrical grid.

BACKGROUND

With the developments of green technologies and the use of renewable resources such as wind and wave energy for provision of mains electricity more and more electrical network utilities are considering the use of such resources in the make-up of their electrical supply.

While these renewable resources have many advantages including their sustainability they suffer in their lack of consistent contribution to the overall make up of the network supply. For example wind generators can only provide energy when the wind is blowing and wave energy convertors require a wave pattern to provide power. Both of these have weather and climatic considerations which do not necessarily match the load requirements of the network.

As a result of the fluctuation in supply from these renewable energy resources the network operators typically also provide traditional sources of power when defining the overall make-up of the origination of the power. However these "carbon-based" power sources cannot typically be activated immediately and require time to come on-line to ensure the grid does not suffer from brown-outs or more critically complete lack of power. To ensure that there is sufficient power for the load at any one time, the predictable power supplies are typically always operated with the transient power that is available during the day from the renewable resources being used as available and as required. However where the available power from such resources exceeds the load on the network the network utility operator will typically discard that energy by deactivating the wind turbine or the like in preference to stopping the predictable power supply. This load management dilemma results in not all available power from the renewable resource being utilised.

Different solutions have been considered for such problems including those generally considered as grid energy storage where electrical energy is stored during times when production (from power plants) exceeds consumption and the stores are utilized at times when consumption exceeds production. Considered solutions contemplate powering batteries for electrical vehicles, compressing air and use of flywheels. All of these while useful in addressing the variances in the load thereby improving efficiency and decreasing energy losses require a conversion to a energy storing mains electricity grid which represents a very costly solution.

There is therefore a problem in management of such network loads to ensure that the use of renewable resources within a network grid can be optimised.

SUMMARY

These and other problems are addressed by a thermal storage device controller in accordance with the teaching of the present invention. Such a controller provides for selective activation of thermal storage devices that are distributed within an electrical network so as to correlate their operation with available power from renewable resources.

Accordingly the invention provides a thermal storage device controller according to claim 1. Advantageous embodiments are provided in the dependent claims.

These and other features of the present invention will be better understood with reference to the following drawings.

BRIEF DESCRIPTION OF THE DRAWINGS

The present invention will now be described with reference to the accompanying drawings in which.

DETAILED DESCRIPTION OF THE DRAWINGS

Figure 1:
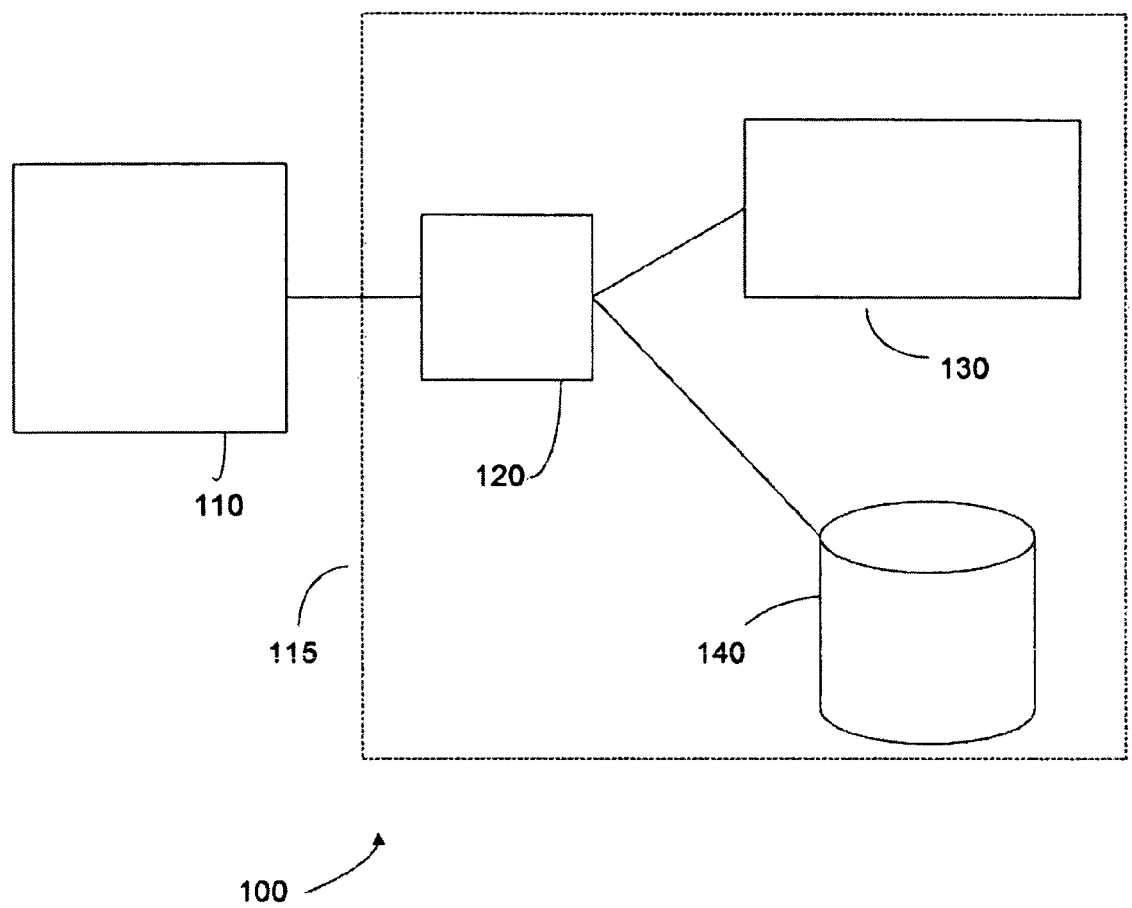
FIG. 1 shows in schematic form a portion of an electrical grid network in accordance with the present teaching.

Exemplary arrangements provided in accordance with present teaching will be described hereinafter to assist with an understanding of the benefits of the present invention. Such arrangements will be understood as being exemplary of the type of controllers that could be provided and is not intended to limit the present invention to any one specific arrangement as modifications could be made to that described herein without departing from the scope of the invention.

In addressing the problems associated with load management within a network electrical grid the present inventors have realised that within the network thermal storage devices such as electrical storage heaters and water cylinders could be selectively powered to match the available power within the grid.

Storage heaters are well known and generally comprise a core consisting of a heat storage medium ("bricks") in an insulated casing. Heating elements are disposed in the midst of the bricks to heat the bricks. Generally the storage heaters are locally controlled so that the heating elements are switched on during a time when the supply of electricity is cheaper (the "off-peak" time), which is usually overnight. This conventionally has been programmed at installation of the heaters, the time of activation of the heating elements being coincident with an advertised time provided by the network operator.

From some electricity suppliers, one or more off-peak periods may be defined during the day, so that, for example the day includes two or more relatively shorter peak periods with off-peak periods in between. During the off-peak period the bricks are heated by the heating elements, typically to a temperature of about 650 C so that heat is stored in the bricks. The insulation ensures that the rate of heat loss from the bricks is reduced to a desired level. During the day, when electricity is more expensive, the heating elements are turned off and heat from the heat storage bricks is radiated into the room to heat the room. The amount of insulation affects the rate of heat loss from the core into the room. This method of heating is advantageous in that it is relatively simple and inexpensive to install, clean in use and relatively cheap to run. However, there are a number of disadvantages.

For example, because heat is stored in the bricks during the off-peak (overnight) period, the core reaches its highest temperature in the early morning, normally at about 7.00 am. Consequently, the heat output from the storage heater is greatest at this time. This is not ideal since most people are more active in the early morning (preparing to go out to work or school etc) and so less heat is required. After reaching its maximum temperature in the morning, heat is lost from the core during the day. The heat output decays approximately exponentially so that by the evening-before the core is recharged with heat-the heat output can be quite low.

In an analogous fashion it is known to heat water within a domestic hot water cylinder using an immersion heating element. Such heating of the water is desirably to a set-point, typically about 60° C. to address potential issues regarding contamination by *legionella* bacteria. Domestic water cylinders are typically about 150 liters capacity and being well insulated can be heated at any time during the day in the anticipation that unless water is drawn from the cylinder such heat will remain in the cylinder until required. Availing of off-peak demand it is known to provide such heating through activation of the electrical coil that forms part of the immersion heater during the off-peak periods.

The present inventors have realised that rather than powering the devices at set pre-determined periods during the day, that by selectively powering them during periods of high power supply from renewable resources such as wind generators that it is possible to maximise the take-up of the renewably sourced electricity within the network. Typical heat values associated with storage heaters are 18 kW hours per day. Taking into account that there are approximately 8 million storage heaters in the United Kingdom, this represents an available load to the grid of 100 MW hours within any 24 hour period.

In order to provide this selective powering of the devices, the present invention provides a controller which is configured to be interfaced between the mains electricity supply and heating elements of the thermal storage devices, the controller defining the supply of electricity to the heating elements and as a result the load taken by the thermal storage devices at any period within the day. In this way the controller acts as a switch or valve between the mains electricity power and the heating elements. The controller is responsive to a signal received from the network operator to availability of excess power within the network and on receipt of the signal is configured to activate the heating elements to absorb some of that excess load.

It will be appreciated that this load take-up function of the thermal storage device represents a secondary function of the device. In the exemplary context that the thermal storage device is a storage heater or a water cylinder, the primary function is to provide to the user of the device respectively space heating or hot water as desired. To this end, while it is useful that the take-up of available energy from the network can be based on signals received from the network operator, the present inventors have realised that it is important that the dictation of when to receive power and effect a heating of the thermal storage device does not result in a situation where the thermal storage device has not received appropriate energy to allow it to meet its expected demand. To that end the controller is desirably configured to monitor the available capacity of the thermal storage device to meet expected demands over a future time period to ensure that the capacity at least meets that demand. Where it is determined that the capacity does not meet the expected demand, the controller may be configured to selectively activate the powering of the heating element(s), overriding any signals received from the network operator to ensure that the primary function of the thermal storage device is met. This override function may be configured to ascertain future periods of high expected load within the network and ensure that the powering of the heating elements is not coincident with those high loads within the network.

The controller may be further configured to select predetermined time periods within any time cycle, for example a 24-hour duration, as periods of low load within the network and selectively activate the heating elements for times within these predetermined load periods irrespective of receipt of signals from the network. For example, it is known to conventionally power these thermal storage devices during the hours of 0000 to 0700 where the network load is conventionally low. A controller within the context of the present teaching could also be configured to select time periods within this predetermined periods to selectively activate the heating elements such that within any time cycle—for example 24 hours—the heating elements will be activated for a minimum period to ensure that the thermal storage device is never depleted to completely low levels.

FIG. 1 shows an exemplary network arrangement 100 in accordance with the present teaching. A network utility provider 110 which is symbolizing the mains electricity grid is configured to provide power to one or more users within the grid as required. In the schematic of FIG. 1, a single user 115 is shown, but it will be appreciated that this user is representative of a plurality of users of electricity within the grid structure. The user 115 comprises in this exemplary arrangement first 130 and second 140 thermal storage devices. In this exemplary schematic the first 130 and second 140 are provided as a storage heater and a water cylinder respectively but it will be appreciated that certain users will have multiples of each of these devices and certain users will have none of one particular type. A controller 120 is provided in the power path between the devices 130, 140 to control the provision of power to heating elements within each of the two devices. While this embodiment shows a single controller that is controlling each of the two devices, it will be appreciated that each device may have its own dedicated controller.

Figure 2:
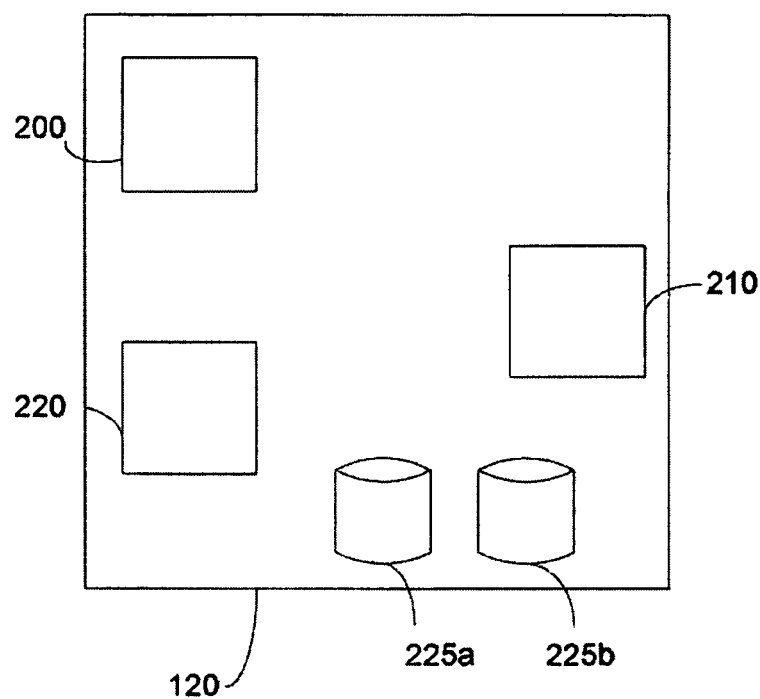
FIG. 2 shows a controller in accordance with the present teaching.

FIG. 2 shows in more detail components of the controller 120. The controller has an input interface 200 for receiving a signal from the network operator regarding availability of power for take up by the thermal storage devices. This signal may be provided in one of a number of different signal types. For example the signal could be provided in a wired or wireless communication protocol. Examples of wired signals include using the mains power lines to transmit a signal or incorporating a dedicated pilot wire. Examples of wireless signals include those used for mobile telecommunication networks, radio frequency signals, WiMax® or the like. It will be appreciated that one or more of these signals types could be used and it is not intended to limit the present teaching to any one specific example of signal transmission type.

Signals could be provided in any one of a number of different fashions. For example a digital signal comprising a plurality of bits could be used to transmit commands from the network operator to the controller. The controller may be configured to recognise a specific signal as being appropriate to that controller or that controller type. Such an arrangement could be most usefully employed where a plurality of controllers are simultaneously in receipt of signals from the network operator but the operator wishes to selectively activate individual ones of the controllers. By initially configuring the controllers to recognise and act on specific signals then a plurality of signals could be transmitted concurrently but each of the controllers would act as appropriately to the signal intended for that controller. In this way the plurality of controllers could be grouped into similar groups or subsets, and each subset would react differently to the signal transmitted from the network. In this way, the load taken from the network could be selectively controlled by timed activation of the specific subsets of thermal storage devices.

On receipt of a signal confirming that it is desired that the thermal storage device being activated thereby taking available power from the network, the controller is configured to, as appropriate and as will be discussed further below, activate to one or more of the storage devices that is coupled to that controller. This activation is desirably through a switch mechanism 210 that selectively couples heating elements of the coupled thermal storage devices to the available power for energising same.

In a first configuration, the energising of the heating elements is effected immediately on receipt of a command signal from the network operator. However a second configuration provides for selective energising on dependent on the current status of the thermal storage device. As was discussed above, each thermal storage device typically has a set point defining the capacity of that device. Heating over this set point may cause damage to the device through overheating. For example in a thermal storage heater, it typically requires the heating element to be activated for a seven hour period in any 24 hour period to provide the necessary heating in the other times. If the storage device is heated constantly the temperatures of the storage bricks may exceed their rated value.

In a water cylinder, once the water temperature has reached 60 degrees (or some other preset value) the heater will typically not activate to ensure that the water does not heat excessively. In a water heating environment where the water is to be used in a domestic water supply it is also important to ensure that the user cannot get scalded through provision of water that is too hot.

Mindful of both these potential dangers the controller is desirably configured to monitor, on receipt of a signal from the network operator, whether any additional heating is required to meet the preset set point. If no heating is required—for example where 7 hours continual heating has already been provided or the device is at its maximum temperature, the controller may elect not to activate the heating elements irrespective of the command received. This capacity of the controller to override instructions received remotely ensures the safe operation of the device. The controller includes a processor 220 that is configured to monitor the powering of the thermal storage devices over a predetermined period. This monitoring may be one or both of recording the timed operation of the heating elements over a historical time period or ascertaining the current operating parameters of the thermal storage devices to ascertain whether additional heating is required to meet the set-point conditions or not. This latter arrangement may require interrogation of the actual devices by the controller through two way signals at the time of decision as to whether to send power to the heating elements or not. In another arrangement a sensor co-located with the individual thermal storage devices may periodically transmit the status of the device to the controller. This status—for example a temperature—may be stored locally at the controller in one or more buffers 225. The buffers may also provide a data store for look-up tables or the like where a relationship between percentage charge of the device and temperature are defined. In this way the controller may process the actual temperature relative to the capacity or set point of the device and define the level of charge necessary to have the device at full capacity.

TABLE 1

Exemplary relationship between the % charge and the core temperature of a storage heater.

| % charge | Core temperature (° C.) |
|---|---|
| 0 | 100 |
| 10 | 250 |
| 20 | 300 |
| 30 | 350 |
| 40 | 400 |
| 50 | 450 |
| 60 | 500 |
| 70 | 550 |
| 80 | 600 |
| 90 | 650 |
| 100 | 700 |

TABLE 2

Exemplary arrangement between % charge and water temperature of a water heater.

| % charge | Water temperature (° C.) |
|---|---|
| 0 | 20 |
| 10 | 25 |
| 20 | 30 |
| 30 | 35 |
| 40 | 40 |
| 50 | 45 |
| 60 | 50 |
| 70 | 55 |
| 80 | 60 |
| 90 | 65 |
| 100 | 70 |

Figure 3:
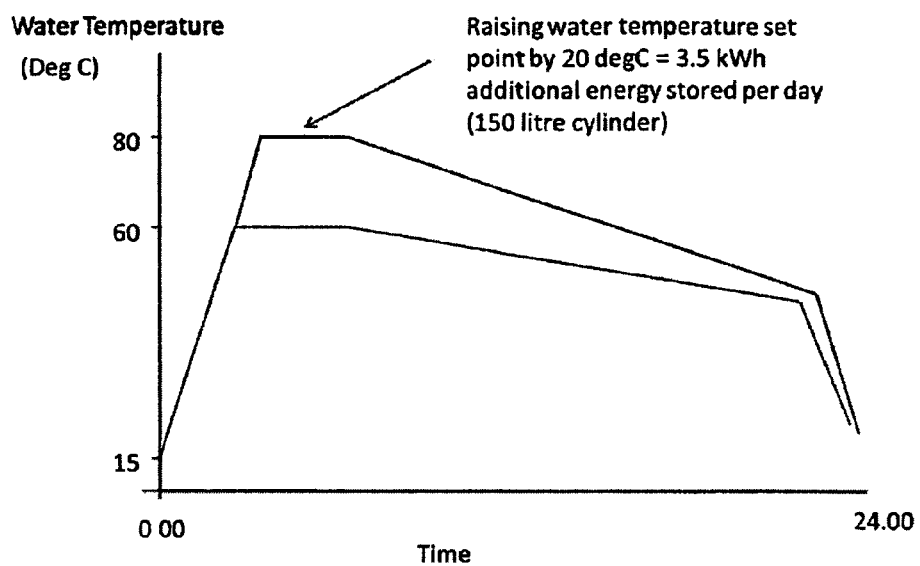
FIG. 3 shows in graphical form the effect of raising the point within a water heater on the available energy take-up.

In a modification to the arrangement just described the controller may be configured to shift the set-point of the thermal storage device to allow the device to receive additional heating above what is required for the normal usage of the device. An example of such an arrangement is where a water boiler has a first set point of 60 degrees centigrade and the water within the cylinder is at 60 degrees. The controller may be configured to temporarily provide a second set point above the first set point, for example 80 degrees, and allow a heating of the water within the cylinder to that temperature to increase the load within the network to compensate for the available power from the renewable resources. It will be appreciated that such arrangements may be effected upon receipt of specific signals from the network. FIG. 3 shows an example of such an arrangement whereby by raising the water temperature set point by 20 deg C. an additional 3.5 kWh additional energy may be stored per day in a typical 150 liter cylinder.

Another example is in the context of a storage heater where the set-point is 7 hours heating within a prescribed 24 hour period but the usage of the device—for example during the winter—allows for the activation of the heating elements for additional time periods as the heat stored is being distributed actively during the day. The controller in this configuration is optimised to monitor the actual temperature of the storage device and allow for additional heating times until a set point temperature as opposed to time is reached.

The controller is desirably also configured to ensure that the primary function of the thermal storage devices is always met. It will be recalled that these primary functions are the provision of space heating and domestic hot water as appropriate. Using the example of space heating, in order to provide heat during the day it is important that the storage device has been previously heated. In the scenario where the heating of the elements is predicated solely on provision of a signal from the network operator, it is possible in times of low wind or the like that the capacity of the network is not such as to require activation of the thermal storage devices. In such a scenario the time period between activation of the thermal storage devices could exceed that required for the storage device to maintain sufficient heat for distribution as a space heater. To ensure that this does not happen the controller may be configured to monitor the current capacity of the thermal storage device to provide energy and the expected requirement for heat over a future time period. When the expected requirement exceeds the capacity the controller may be configured to activate the heating elements irrespective of the fact that a signal has not been received from the network requiring activation.

It will be appreciated that such expected load may overlap with periods of traditional high load within the network. For example the periods of 1700-1900 are typically high load times within an electrical network where multiple cooking devices are simultaneously activated. This also is a time where heating is required. To ensure that the thermal storage device is appropriately charged to provide the necessary heating the controller may be configured to monitor future load and capacity and effect a heating of the heating elements based on this forecasting. This forecasting can ensure that heating of the thermal storage device to meet the primary function does not overlap with periods of already high load within the network, thereby assisting in network load management.

It will be appreciated that on receipt of a signal to activate heating elements in a plurality of thermal storage devices that simultaneous activation of these plurality of devices may cause a temporary spike in the network frequency. To ameliorate this, each of the controllers may be configured to activate their respective heating elements after expiry of a delay period to ensure that concurrent activation is not provided. This may be computed on the basis of a random variable, a fixed time or the like. Such shifting of the start time of a plurality of devices may assist in load management at a network level.

Heretofore, the activation of the heating elements has been described with reference to receipt of a start signal received from the network at the controller. On receipt of such a signal, the controller is configured to allow for heating until one or more of receipt of a subsequent stop signal from the network, the reaching of a set point representing capacity of the device, or for example in the context of a space heater where the room temperature has reached a desired level. In a modification to that described heretofore the activation signal may include a start and stop time for the controller or a start time with a request that heating of the device is continued until a prescribed level of storage is achieved.

Figure 4:
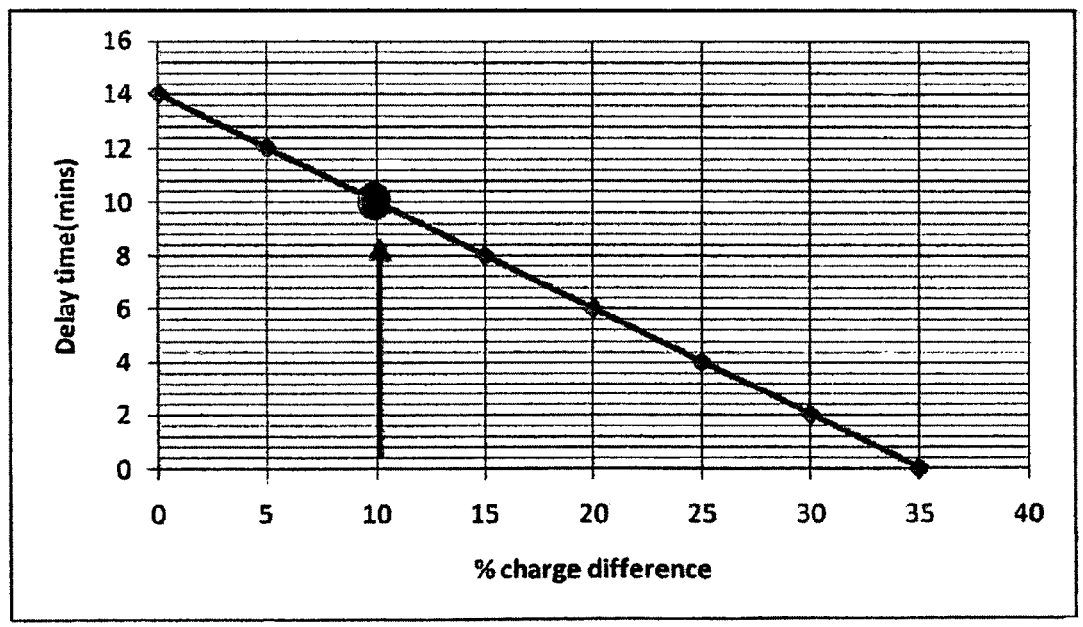
FIG. 4 shows in graphical form an exemplary form of a delay time calculation in accordance with the present teaching.

FIG. 4 shows such an exemplary arrangement whereby the controller receives a signal @16:00 representing a request for the controller to provide the thermal storage device at a 65% charge over a 4 hours operation (charge time). The controller interrogates the device and determines that its current charge as a percentage of the overall charge in the heater core @16:00 is 55%.

The charge controller will then calculate a delay start time based on a lookup table (as tabulated from for example Table 1 above). In this instance the difference in charge level is 10% (65%−55%) so this equates to a delay time of 10 mins. The controller will then start a countdown timer ((CT) in this case 4 hours). The heater will not charge until the delay time (10 mins) has elapsed. At the end of the 10 minutes the charge controller will compare the room temperature versus the room temperature setpoint. As this is day period 2, the room temperature setpoint is the setpoint on the user interface+2° C. (this is to allow boost in the afternoon period). If the room temperature is <0.2° C. below the set temperature then the heater will charge. The heater will stop charging if any of the following conditions are true:

the room temperature equals the set temperature.
the core temperature is above the target temperature
the charge time has elapsed.

It will be appreciated that a controller in accordance with the present teaching allows for a flexible interface between the requirements of the network operator to balance the load available with the load on the network by selectively activating thermal storage devices within the network and the requirements of the user to manage their heating (be that space or domestic water supply). Conventionally this relationship was defined by static definitions of when the heating elements could be activated—typically in low network usage times such as between 0000 and 0700. In accordance with the present teaching the controller allows for additional balancing during periods of the day when the network has additional capacity due to bringing on of renewal energy source based on favourable weather conditions. As the thermal storage device can be rapidly brought on-line to compensate for the additional capacity—for example within about 10 seconds, this represents a rapid resource of large capacity to counter the increased available power within the network. To ensure that the selective activation of the heating elements does not result in deterioration in the primary function of these devices, the controller is provided with an override function to ensure that the thermal storage devices are adequately powered at any one period to meet their future heating requirements. This could also be done in combination with fixed charging times. For example if the network utility provides a minimum of 4 hours between 0.00 to 7.00 and up to a further 6 hours between 9.00 and 24.00 (avoiding 17.00 to 19.00) the controller can optimise the use of that energy up to a set point of 7 hours charging to ensure comfort during the main heating periods.

Figure 5:
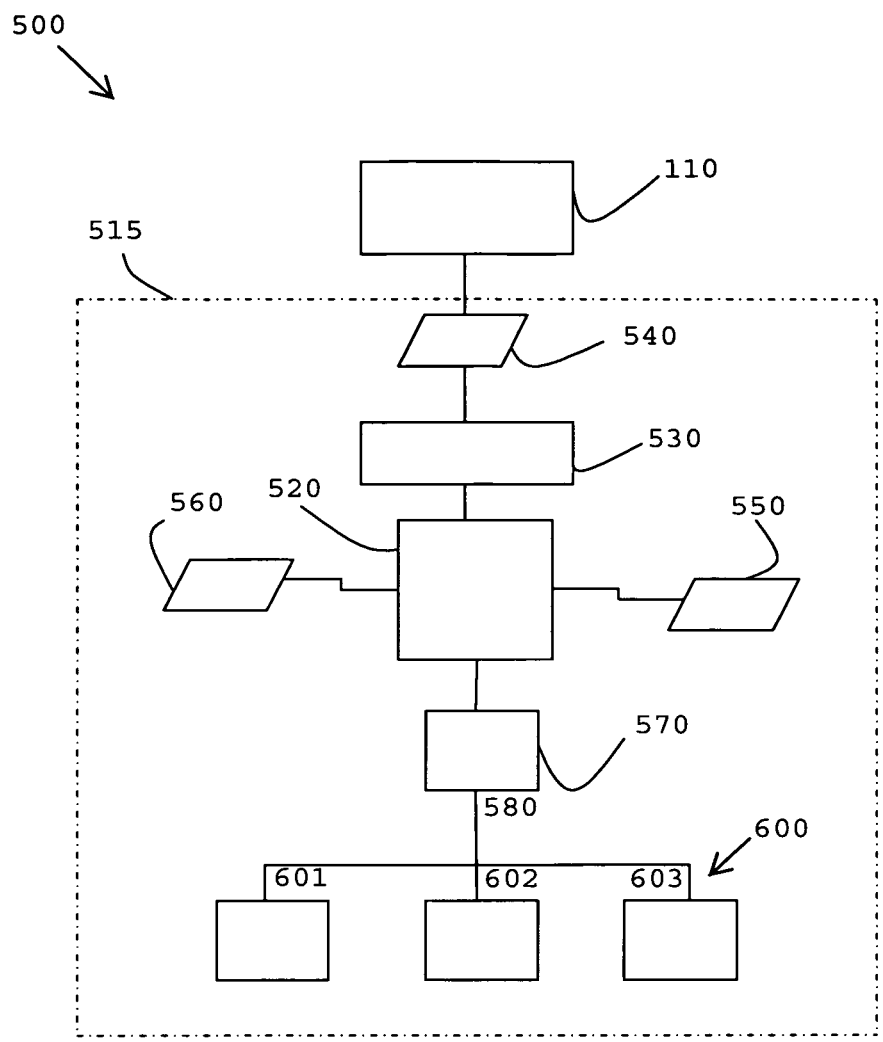
FIG. 5 shows a block diagram of an alternative controller in accordance with the present specification.

Referring to FIG. 5 and tables 3 and 4, a further exemplary network arrangement 500, with network provider or network operator 110, single user 515 and a controller 520 according to the present specification is described. It will be appreciated that the network arrangement 500 is similar to the network arrangement 100 described above. In the schematic of FIG. 5, a single user 515 is shown, but it will be appreciated that this user is representative of a plurality of users of electricity within the grid structure. The user 515 comprises a first thermal storage device. In this exemplary schematic the first thermal storage device or appliance 600 is a water cylinder. However, as described above, different thermal storage devices may alternatively be used or may be used in combination, for example, storage heaters. It will further be appreciated that certain users may have multiples of each of these devices and certain users will have none of one particular type. A controller 520 is provided in the power path between the network and the thermal storage device 600 to control the provision of power to the device 600 and heating elements 601, 602 and 603 within the device.

The controller 520 similar to the controller 120 described above is operative to receive signals from a network operator 110 regarding availability of power for take up by the thermal storage device and to provide control signals to the domestic device or appliance 600 to control operation thereof as required.

The controller 520 comprises a number of inputs/input means. The controller 520 is configured to receive demand side management signals from the network operator via interface 530 to which signal 540 is provided. The controller 520 is further configured to monitor and receive temperature/water temperature and/or available capacity in the thermal storage device/water cylinder via input/interface 560. The controller 520 may additionally comprise means for receiving and monitoring mains frequency response and/or frequency response variation data/signals via input/interface 550.

Thus similarly to the controller 120, the controller 520 is operable to provide demand side management based on signals received from the network provider and monitoring of available capacity. Further, the controller 520 may provide frequency response regulation by control of the local thermal storage device/s 600. The frequency response regulations may be provided taking account of the signals from the network provider. The frequency response regulation may be provided taking account of other inputs namely the available capacity 560 and frequency response input 550.

In effect, the controller 520 is configured to receive data/signals from the network provider and the other inputs 550, 560, to interpret them, prioritise them and send control signals 580 via switch 570 to the thermal storage device 600. The controller 520 provides for operation of the appliance 600 in different modes and comprises means for varying the power input to the thermal storage device 600 from 0 to maximum load as required. The controller 520 is configured to receive and interpret a signal from the network provider into a set point and power input and output a control signal to the device. Based on the signal control 580 from the controller 520, the device 600 may be operated at a power input from 0 to maximum load, as required.

The controller 520 further comprises means for defining at least two set points for the thermal storage device 600, a default/nominal set point and a maximum set point. In a first default setting or nominal setting the water cylinder 600 is operated in a "trickle charge" mode to maintain a constant internal temperature. The internal temperature is set such that it is high enough to ensure the appliance 600 can provide comfort heating or hot water if required but importantly still have capacity to increase the temperature (demand) if required.

This default or nominal setting/set point advantageously provides flexibility in operation of the thermal storage device and allows for a response in the event the network provider sends a signal to increase the set point and power input for example, if the network provider indicates that a surplus in renewable generation is available. Conversely, the default or nominal setting also allows for a response in the event the signal from the network provider indicates that a reduction of load and power input is required. The controller is thus configured to provide control signals to the thermal storage device based on the data received from the network provider. The control signals may include increase power input or decrease power input. The default or trickle charge mode of operation facilities a response from the single user and controller in the event of a signal to increase set point and power input and in the event of a signal to decrease set point and power input.

While in the exemplary embodiment, signals are provided to the controller 520 from the network provider via interface 530 it will be appreciated that in an alternative arrangement, the controller 520 may be configured to receive signals from the network provider via Wi Fi or GSM and as described previously, to interpret the signals, prioritise them and then send control signals to the thermal storage device 600.

In the exemplary arrangement of FIG. 5, the thermal storage device, here, a water cylinder 600 comprises multiple immersion elements and in this case three immersion elements 601, 602, and 603. Multiple immersion elements are provided to support and achieve variable input power as required and to avoid rapid switching of high loads and the associated EMC issues. The elements 601, 602 and 603 of the present embodiment are 2×750 watts and 1×1500 watts. Referring to table 3 below exemplary excess capacity loading steps associated with the elements 601, 602 and 603 are provided.

TABLE 3

Excess Capacity Loading Steps

| Power steps | 750 W | 750 W | 1500 W | Total Load |
|---|---|---|---|---|
| 1 | 0 | 0 | 0 | 0 |
| 2 | 0.5 | 0 | 0 | 375 |
| 3 | 1 | 0 | 0 | 750 |
| 4 | 0.5 | 1 | 0 | 1125 |
| 5 | 0 | 0 | 1 | 1500 |
| 6 | 0.5 | 0 | 1 | 1875 |
| 7 | 1 | 0 | 1 | 2250 |
| 8 | 0.5 | 1 | 1 | 2625 |
| 9 | 1 | 1 | 1 | 3000 |

It will be appreciated that for the system 500 and user 515 to work the domestic thermal storage device 600 must be highly insulated. This allows high temperature storage without wasting energy or influencing the surrounding ambient temperature. It will be appreciated that while in the embodiment described the immersion elements are provided as separate units, they may in an alternative arrangement be combined into one unit.

As noted above, the controller 520 may further comprise means for receiving data and/or monitoring the frequency and/or frequency variation of the incoming grid electricity via input 550. The controller 520 may be further configured to provide an output signal to regulate the thermal storage device power in response to the frequency variation detected. Such an arrangement is configured to support frequency regulation in the network. In the exemplary arrangement the switch 570 is provided as triac device which is operable for switching power in proportion to the frequency of the electrical grid.

While traditional generators have frequency response built into them, this ensures that the grid frequency is maintained at 50 Hz+/−0.5 Hz, wind generation for example, does not have such a frequency response. The controller 520 is configured to support frequency regulation within an energy network via with the regulation of power of the thermal storage device/s 600 which are being used to store the energy. In one example, the controller 520 appropriately regulates power to the thermal storage device 600 via the switch 570 when the frequency of the electrical grid deviates from 50 Hz+/−0.5 Hz.

The controller 520 is programmed such that as the frequency of the electrical grid deviates from 50 Hz+/−0.5 Hz the load of the thermal storage device 600 is gradually changed over a period of time. For example, as the frequency of the electrical grid drops the load of the thermal storage device 600 is gradually reduced as opposed to a rapid change which could cause instability in the electrical grid.

The response to the frequency data/frequency variation data provided via input 550 to the controller 520 may be dynamic in that the signal from the network provider may be a gradient of a curve of frequency v power. The controller 530 may be configured to store different gradients and to respond accordingly.

The controller 520 may be configured in a first frequency response regulation mode to maintain a frequency response capability in the thermal storage device 600. In this mode, the thermal storage device 600 will not be switched off completely when there is no heat demand but will be switched by the controller 520 to a load which matches the static heat loss of the device. For example, a water cylinder 600 may have a static heat loss in the range 75 to 90 watts depending on the stored water temperature, the "Off" position will therefore be maintained at 75 watts by the controller 520.

While this may appear to be a very low load in respect of a single or a few local domestic the thermal storage device or appliances, when as described above the local domestic appliances are considered in the context of an overall network then the overall load in the network may be considered as potentially thousands of the thermal storage device or domestic appliances and thus overall it provides a meaningful frequency response within the network. Referring to table 4 below exemplary frequency loading steps are shown.

TABLE 4

Frequency loading steps

| Power steps | 750 W | Total load |
|---|---|---|
| Off | 0 | 0 |
| 1 | 1 | 75 |
| 2 | 1 | 150 |
| 3 | 1 | 225 |
| 4 | 1 | 300 |
| 5 | 1 | 375 |
| 6 | 1 | 450 |
| 7 | 1 | 525 |
| 8 | 1 | 600 |
| 9 | 1 | 675 |
| 10 | 1 | 750 |

The controller 520 is operable to set the operating power level of the thermal storage device 600 from a first power level to a second power level in a plurality of steps over a period of time where each step represents a discrete power level adjustment. For example, if it desirable to change the power level of the thermal storage device 600 from 1 Kw to 500 W as result of the frequency of the electrical grid falling, the controller 520 steps down the operating power level of the storage device 600 over a period of time. The step size may be any nominal size such as 100 W therefore the reduction from 1 Kw to 500 W would require 5 steps. The time lag between steps may be any nominal time period, for example, switching could occur at 200 ms intervals.

It will be appreciated that while different features of the controller have been described with reference to the different embodiments that the different functions may be combined as appropriate or as required within a single controller arrangement. The controller 520 provides a number of advantages therein. The controller is configured to maintain flexibility within the overall network and system. By having a nominal or default setting wherein the thermal storage device is operated at a trickle charge the system provides for a response in the event that a network provider indicates that there is a surplus energy and that the power input should be increased but also in the event that the power input needs to be decreased in response to a signal from the network provider. Similarly, the system support frequency regulation in the network, the system and controller being configured to maintain a frequency response capability through operation of the thermal storage device at a load which matches the static heat loss of the device.

Figure 6:
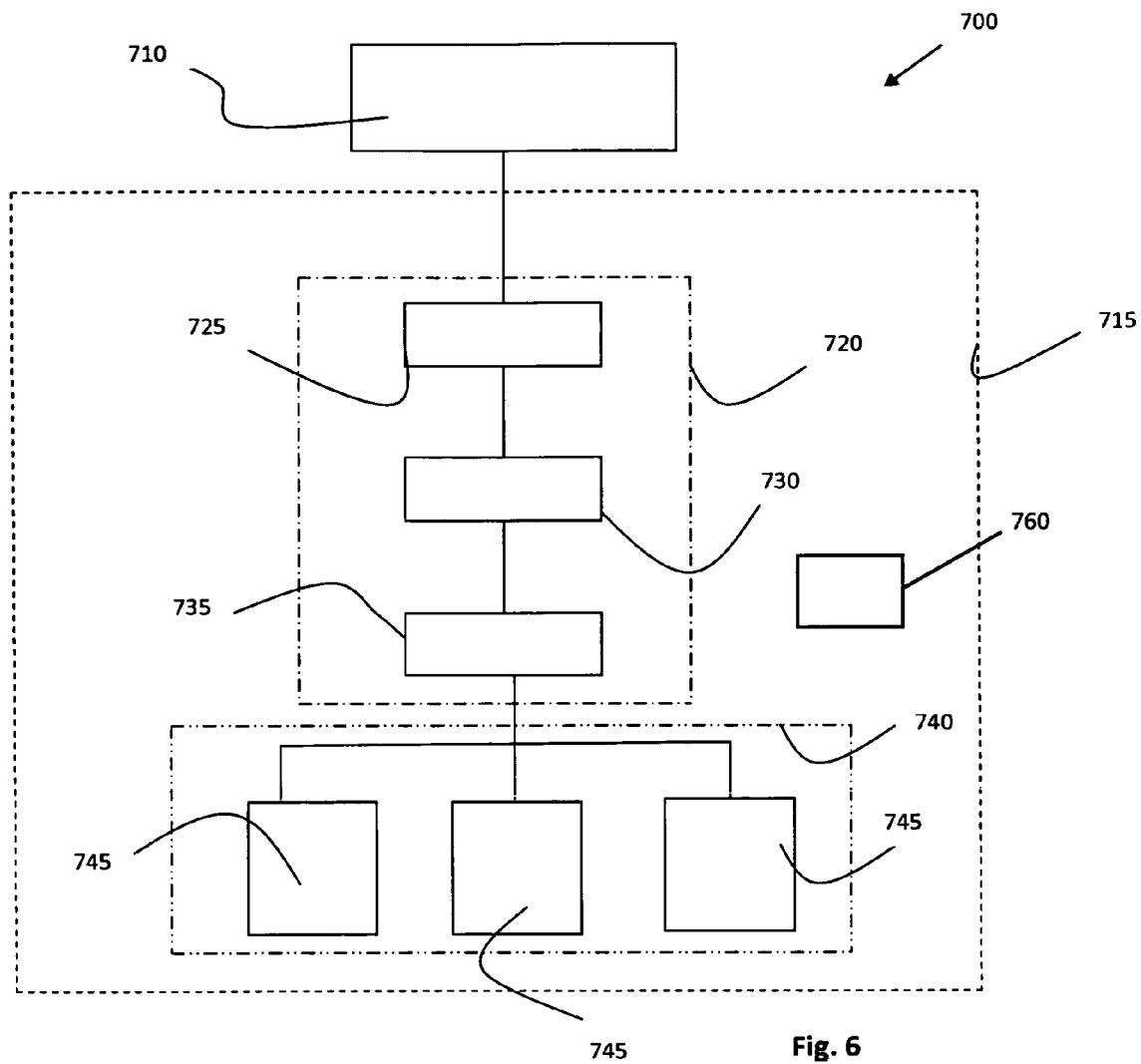
FIG. 6 shows a network arrangement in accordance with the present teaching.

Referring to FIG. 6, there is provided a further exemplary network arrangement 700. The network arrangement 700 includes a network provider or network operator 710, a building unit 715 and a controller 720. The electricity supply circuit of the building unit 715 includes a number of thermal storage devices 740 only one of which is illustrated for convenience. The controller 720 is configured to be interfaced between the mains electricity supply and the heating elements 745 of the thermal storage devices 740. Power to at least one heating element 745 within the thermal storage device is controlled by the controller 720 such that the thermal storage device 740 is maintained with a continuous heat reserve. In other words, the thermal storage device 740 is prevented from falling below the threshold temperature and remains at least partially charged. The controller 720 comprises an interface 725 for receiving a control signal from the remote network operator 710. A processor 730 is provided on the controller 720 and is configured on receipt of the control signal to select one of a plurality of power levels and to provide a charge signal associated with the selected power level. A data repository may be provided on the controller 720 for storing the plurality of power levels. A charge unit 735 is in communication with the processor 730 and is configured on receipt of the charge signal to supply at least one heating element 745 at the selected power level from a mains supply.

The controller 720 is operable to provide demand side management based on control signals received from the network provider 710. Further, the controller 720 may provide rapid frequency response regulation by increasing or decreasing power to the thermal storage devices 740. By maintaining the thermal storage device 740 at least partially charged ensures that a heat reserve is continuously available thereby reducing the potential spike in demand as result of thermal storage devices being switched on if climatic conditions deteriorate suddenly. It will be appreciated that less energy is required to charge the devices 740 with heat if the devices are kept constantly partially charged compared to if they were completely empty. Also empty devices 740 do not allow the operator 710 to regulate the frequency response of electrical network by decreasing power demand. Thus, by having partially charged devices 740 the operator 710 can regulate the frequency response in both directions by increasing or decreasing power demand.

The controller 720 may operate as a trickle charger or a float charger. When the controller 720 operates as a trickle charger, the charge unit 735 provides a continuous quantity of power to the devices 740 so that they are charged with heat at a similar rate as their self-discharging heat rate. In other words, the charge unit 735 provides a load which matches the static heat loss of the thermal storage devices. When the controller 720 operates as a float charger the charge unit 735 provides power to the devices 740 intermittently thereby preventing the thermal storage device from heating beyond a preset point. The charge unit 735 may sense the temperature of the thermal storage device and/or the ambient air temperature. When a predetermined temperature is sensed by the charge unit 735 power to the device 740 is temporarily ceased. In one arrangement, when the charge unit 735 senses a certain temperature the supply of power to the thermal storage 740 is resumed. The charge unit 735 may include electrical components such as a thermostat and one or more switches. The power level at which the controller 720 operates the device 740 may be associated with forecasted climatic conditions, real-time climatic conditions, historical climatic conditions, historical demand patterns, predicted electricity demand, current demand or statistics. The climatic conditions may include at least one of temperature, wind, rainfall, humidity, atmospheric pressure, and atmospheric particle count. Furthermore, the power levels may be associated with a particular time of year, for example the month or season. The controller 720 may be configured to set the maximum temperature of the device 740 based on control signals received from the network provider 710. These control signals may also relate to climatic conditions.

The controller 720 may be operable to read a sensed condition such as the temperature of the thermal storage device and/or the ambient air temperature. The interface 725 may include a bi-directional communication link with the operator 710 for facilitating the transmission of sensed conditions to the operator 710. The operator 710 if desired can at least partially base the control signals that its sends to the controller 720 on the sensed conditions received from the controller 720. The controller 720 may also include a communication sub-system which allows the controller to interrogate the network operator for requesting the control signal.

The controller 720 provides a number of advantages therein. The controller is configured to maintain flexibility within the overall network and system. By controlling the thermal storage devices 740 to have a continuous heat reserve by maintaining the devices to be at least partially charged allows for a response in the event that a network provider indicates that there is a surplus energy and that the power input should be increased but also in the event that the power input needs to be decreased in response to a signal from the network provider. Similarly, the system support frequency regulation in the network, the system and controller being configured to maintain a frequency response capability through operation of the thermal storage device at a load which matches the static heat loss of the device. The present teaching also relates to an electrical grid load management tool which includes a plurality of controllers 720, the controllers allowing for selective powering of a network of thermal storage devices 740 to provide a heat reserve. It will be appreciated that the tool may be used to regulate the frequency response of an electrical grid by increasing or decreasing the power level to the thermal storage devices 740.

In an alternative arrangement the controls signals to the controller 720 from the network operator 710 may be associated with tariff information. The power level at which the controller 720 operates the device 740 may be associated with electricity price information. For example if the price of a unit of electricity is <5 p the controller 720 will instruct the device 740 to charge if storage capacity is available. However, if the price of a unit of electricity is greater than 5 p the controller 720 will instruct the device 740 not to charge. The controller 720 could be programmed to react to electricity price fluctuation. In an exemplary arrangement, there may be three levels of pricing e.g. <5 p always charge, 5 to 7 p charge if core temperature is below a certain level, >7 p never charge. In this scenario, the device 740 can be operated as bi-state device with an on mode and an off mode. The controller 740 may also be operable receive electricity price information from third party sources.

The controller 720 may also include a switching element 760 operable for switching the thermal storage device 740 to one of a plurality of operating modes with each operating mode having an associated default core temperature. In one exemplary arrangement the thermal storage device is selectively switchable between a first operating mode, a second operating mode and a standby operating mode. In the standby mode the thermal storage device 740 is effectively switched off but it may be activated on demand. The default core temperatures associated with the first and second operating modes may be set in anticipation of expected seasonal temperatures. For example; the first operating mode may be associated with winter time with the default core temperature of the thermal storage device set at 550° Celsius. The second operating mode may be associated with spring time with the default core temperature of the thermal storage device set at 400° Celsius. The ambient air temperature during spring time would typical be higher than during winter time and as consequence the space heating requirements during spring time would typically be less than during winter time. Thus by actively switching the default core temperature of the thermal storage device 740 between higher and lower default temperatures allows energy to be saved when the thermal storage device is operating at the lower default temperature. The default core temperature of the thermal storage device is switchable by actively selecting the operating mode of the thermal storage device. While two default core temperatures have been described in the exemplary arrangement it will be appreciated by those skilled in the art that any desired number of default core temperatures/operating modes may be provided. For example, in certain environments it may be desired to have a default temperature/operating mode associated with each month of the calendar year. The switching element 760 may be a smart device that is responsive to a control signal from the remote network operator 710 for selectively switching the thermal storage device to a predetermined operating mode. Alternatively, the switching element may be operated manually for switching between the modes. The switching element 760 and its operation may also be incorporated into the controller of FIGS. 2 and 5.

The words comprises/comprising when used in this specification are to specify the presence of stated features, integers, steps or components but does not preclude the presence or addition of one or more other features, integers, steps, components or groups thereof.

While the present invention has been described with reference to some exemplary arrangements it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

The invention claimed is:

1. A controller for managing the activation of at least one heating element within a thermal storage device, the controller comprising:
   a. A first interface for receiving a signal from a remote network operator regarding availability of power within a electricity grid for take up by the thermal storage device;
   b. A processor configured on receipt of the signal to determine whether to switch the heating element to take up available power and to provide an activation signal in positive response of said determination;
   c. A switch in communication with the processor and configured on receipt of the activation signal to energise the heating element, wherein the controller is configured to:
adjust a preset set-point of the thermal storage device, thereby allowing the thermal storage device to receive additional heating above what is required for the normal usage of the device;
selectively energise the heating element dependent on the current status of the thermal storage device;
monitor, on receipt of the signal from the network operator, whether activation of the heating element is required to meet the preset set-point of the thermal storage device;
interrogate current operating parameters of the thermal storage device to ascertain whether additional heating is required to meet the set-point; and
interact in a two-way signal interaction with the thermal storage device at the time of decision as to whether to energise the heating element.

2. The controller of claim 1 wherein on determination that no heating is required, the controller is configured to elect not to activate the heating element irrespective of the signal received.

3. The controller of claim 1 wherein the controller is configured to record the timed operation of the heating element over a historical time period to determine whether additional heating is required.

4. The controller of claim 1 wherein the controller is configured to receive a periodic signal from a sensor co-located with the thermal storage device regarding a status of the device, the controller being further configured to use this periodic signal at the time of decision as to whether to energise the heating element.

5. The controller of claim 1 comprising at least one data store providing a defined relationship between a percentage charge of the thermal storage device and temperature.

6. The controller of claim 5 configured to process a sensed actual temperature relative to the capacity or set point of the device and define the level of charge necessary to have the device at full capacity.

7. The controller of claim 1 configured to monitor the current capacity of the thermal storage device to provide energy and the expected requirement on the device to provide heat over a future time period.

8. The controller of claim 7 configured such that when the expected requirement exceeds the capacity the controller activates the heating elements irrespective of the fact that a signal has not been received from the network requiring activation.

9. The controller of claim 7 configured to forecast future load on the network and to effect an energising of the heating element based on this forecasting to ensure heating of the thermal storage device does not overlap with periods of already high load within the network, thereby assisting in network load management.

10. The controller of claim 1 configured to generate a delay in providing the activation signal in positive response of said determination to switch the heating element to take up available power.

11. The controller of claim 1 wherein the received signal from the network includes an indicated start and stop time for the controller or a start time with a request that heating of the device is continued until a prescribed level of storage is achieved, the controller being configured to interrogate the signal and determine an appropriate action.

12. The controller of claim 1 wherein the received signal comprises a plurality of signals for different controllers, the controller being configured to determine a correct signal for that controller.

13. The controller as claimed in claim 1 configured to effect activation of the at least one heating element at predetermined times.

14. The controller of claim 1 coupled to and controlling a plurality of thermal storage devices.

15. The controller as claimed in claim 1, wherein the processor is operable on receipt of the control signal to select one of a plurality of power levels and to provide a charge signal associated with the selected power level.

16. The controller as claimed in claim 15, further comprising a charge unit in communication with the processor and configured on receipt of the charge signal to power the at least one heating element at the selected power level from a mains supply thereby ensuring that the thermal storage device is maintained at least partially charged.

17. A controller as claimed in claim 16, wherein the charge unit is configured to provide a load which matches the static heat loss of the thermal storage device.

18. A controller as claimed in claim 16, wherein the charge unit is configured for supplying power to the thermal storage device at a level such that the device is charged with heat at a similar rate as its self-discharging heat rate.

19. A controller as claimed in any claim 16, wherein the charge unit is configured for preventing the thermal storage device from overheating beyond a preset point.

20. A controller as claimed in claim 16, wherein the charge unit is configured for sensing the temperature of the thermal storage device.

21. A controller as claimed in claim 16, wherein the charge unit is configured for sensing the ambient air temperature.

22. A controller as claimed in claim 20, wherein the charge unit is configured for temporarily ceasing the supply of power to the thermal storage device when the thermal storage device is at or above a predetermined temperature.

23. A controller as claimed in claim 22, wherein the charge unit is configured for resuming power supply to the thermal storage device when the thermal storage device is at or below a predetermined temperature.

24. A controller as claimed in claim 21, wherein the charge unit is configured for temporarily ceasing the supply of power to the thermal storage device when the ambient air temperature is at or above a predetermined temperature.

25. A controller as claimed in claim 24, wherein the charge unit is configured for resuming the supply of power to the thermal storage device when the ambient air temperature is at or below a predetermined temperature.

26. A controller as claimed in claim 15, wherein the controller further comprises a thermostat.

27. A controller as claimed in claim 15, wherein the charge unit comprises at least one switch.

28. A controller as claimed in claim 15, further comprising a data repository for storing the plurality of power levels.

29. A controller as claimed in claim 15, wherein the power levels are associated with forecasted climatic conditions.

30. A controller as claimed in claim 29, wherein the forecasted climatic conditions includes wind.

31. A controller as claimed in claim 29, wherein the forecasted climatic conditions includes humidity.

32. A controller as claimed in claim 29, wherein the forecasted climatic conditions include rainfall.

33. A controller as claimed in claim 29, wherein the forecasted climatic conditions include atmospheric pressure.

34. A controller as claimed in claim 29, wherein the forecasted climatic conditions include atmospheric particle count.

35. A controller as claimed in claim 15, wherein the power levels are associated with real-time climatic conditions.

36. A controller as claimed in claim 35, wherein the real-time climatic conditions includes at least one of temperature, wind, rainfall, humidity, atmospheric pressure, and atmospheric particle count.

37. A controller as claimed in claim 15, wherein the power levels are associated with historical climatic conditions.

38. A controller as claimed in claim 37, wherein the historical climatic conditions includes at least one of temperature, wind, rainfall, humidity, atmospheric pressure, and atmospheric particle count.

39. A controller as claimed in claim 15, wherein the power levels are associated with the months of the year.

40. A controller as claimed in claim 15, wherein the power levels are associated with the seasons of the year.

41. A controller as claimed in claim 15, configured to read a sensed condition.

42. A controller as claimed in claim 15, configured to read a sensed temperature of the thermal storage device.

43. A controller as claimed in claim 15, configured to read a sensed ambient temperature.

44. A controller as claimed in claim 42, configured to communicate the sensed temperature of the thermal storage device to the network operator.

45. A controller as claimed in claim 44, wherein the control signal from the network operator is at least partially based on the sensed temperature of the thermal storage device.

46. A controller as claimed in claim 43, configured to communicate the sensed ambient temperature to the network operator.

47. A controller as claimed in claim 46, wherein the control signal from the network operator is at least partially based on the sensed ambient temperature.

48. A controller as claimed in claim 41, configured to communicate the sensed condition to the network operator.

49. A controller as claimed in claim 48, wherein the control signal from the network operator is at least partially based on the sensed condition.

50. A controller as claimed in claim 15, configured to interrogate the network operator for requesting the control signal.

51. A controller as claimed in claim 15, wherein the controls signals to the controller from the network operator are associated with electricity tariff information.

52. A controller as claimed in claim 1, wherein the thermal storage device has a plurality of operating modes with the respective operating modes having an associated default core temperature.

53. A controller as claimed in claim 52, further comprising a switching element for selectively switching between the operating modes.

54. A controller as claimed in claim 52, wherein the switching element is configured to be responsive to a control signal from the remote network operator for selectively switching the thermal storage device to one of the operating modes.

55. A controller as claimed in claim 52, wherein the switching element is configured to be manually operated for switching the thermal storage device to one of the operating modes.

56. A controller as claimed in claim 53, wherein the thermal storage device has a first operating mode and a second operating mode.

57. A controller as claimed in claim 56, wherein the thermal storage device has a standby mode.

58. A controller as claimed in claim 57, wherein the switching element is operable for selectively switching the thermal storage device to one of the first operating mode, the second operating and the standby operating mode.

59. A controller as claimed in claim 58, wherein when the thermal storage device is in the first operating mode its default core temperature is set at 550° Celsius.

60. A controller as claimed in claim 58, wherein when the thermal storage device is in the second operating mode its default core temperature is set at 400° Celsius.

61. An electrical grid load management tool comprising a plurality of controllers as claimed in claim 1, the controllers allowing for selective powering of a network of thermal storage devices to provide a heat reserve.

62. The controller of claim 1 co-located with the thermal storage device which it controls.

63. An electrical grid load management tool comprising a plurality of controllers as claimed in claim 1, the controllers allowing for selective activation of a network of thermal storage devices to absorb excess capacity within the grid.

64. The tool of claim 63 wherein the controllers are grouped into sets, the tool being configured to selectively activate individual sets of thermal storage devices.

* * * * *